US011768365B2

(12) United States Patent
 Greenwald

(10) Patent No.: US 11,768,365 B2
(45) Date of Patent: *Sep. 26, 2023

(54) OPTICAL ELEMENT SUPPORT SYSTEM AND METHOD

(71) Applicant: THE BOEING COMPANY, Chicago, IL (US)

(72) Inventor: David Greenwald, O'Hara, PA (US)

(73) Assignee: The Boeing Company, Arlington, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/338,356

(22) Filed: Jun. 3, 2021

(65) Prior Publication Data

US 2021/0294088 A1  Sep. 23, 2021

Related U.S. Application Data

(63) Continuation of application No. 16/048,293, filed on Jul. 29, 2018, now Pat. No. 11,061,217.

(51) Int. Cl.
 *G02B 23/16* (2006.01)
 *G02B 7/182* (2021.01)
 *G02B 7/02* (2021.01)

(52) U.S. Cl.
 CPC .............. *G02B 23/16* (2013.01); *G02B 7/02* (2013.01); *G02B 7/182* (2013.01)

(58) Field of Classification Search
 CPC ........... G02B 23/16; G02B 7/02; G02B 7/182
 USPC ....................................................... 359/819
 See application file for complete search history.

(56) References Cited

U.S. PATENT DOCUMENTS 2,003,171 A * 5/1935 Burrell ................... G02B 23/16
  359/873
5,151,809 A * 9/1992 Meier .................... G02B 7/183
  359/848

FOREIGN PATENT DOCUMENTS

JP  2012185278 A  *  9/2012
JP  2012185278 A     9/2012

OTHER PUBLICATIONS

Malvick, A. J., "Theoretical Elastic Deformations of the Steward Observatory 230-cm and the Optical Sciences Center 154-cm Mirrors", Applied Optics, Mar. 1972, pp. 575-585.

(Continued)

*Primary Examiner* — Joseph P Martinez
*Assistant Examiner* — Mitchell T Oestreich
(74) *Attorney, Agent, or Firm* — Patterson + Sheridan, LLP

(57) ABSTRACT

An optical element support system and a method of supporting an optical element are provided. The optical element includes an optical axis, an arcuate front surface, and a back surface. The optical element support system includes an axial support system that provides axial support to the optical element in a direction parallel to the optical axis of the optical element, and further includes a lateral support system that provides lateral support to the optical element in one or more directions perpendicular to the optical axis of the optical element that is offset from a center-of-gravity of the optical element.

21 Claims, 7 Drawing Sheets

(56) References Cited

OTHER PUBLICATIONS

Vukobratovich, Daniel et al., "Roller chain supports for large optics", Proc. SPIE, Mar. 1, 1991, pp. 522-534.
Schwesinger, Gerhard, "Nondistorting lateral edge support of large telescope mirrors", Applied Optics, Mar. 1, 1994, pp. 1198-1202.
Kimbrell, James E., et al., "AEOS 3.67-m telescope primary mirror active control system", Proc. SPIE, Aug. 25, 1998, pp. 400-411.

* cited by examiner

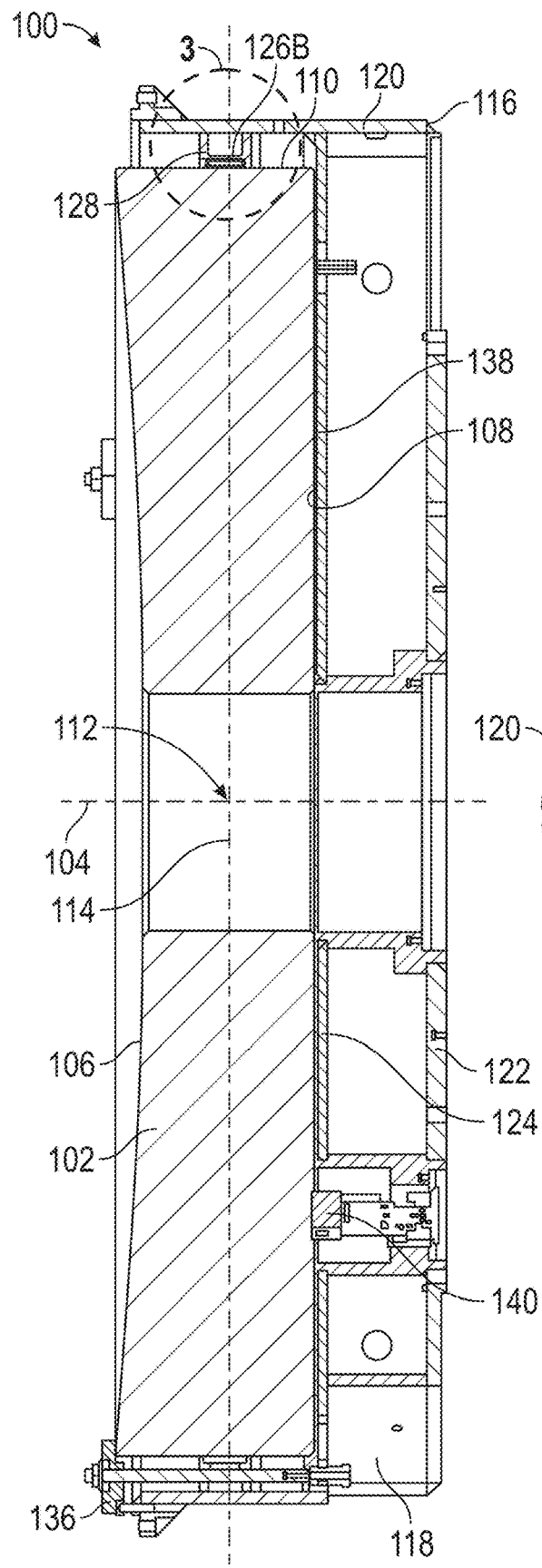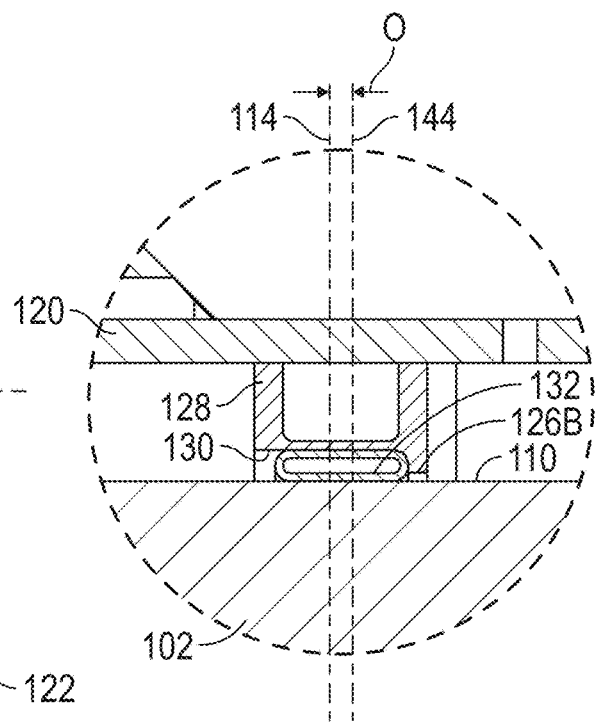
FIG. 2
FIG. 3

OPTICAL ELEMENT SUPPORT SYSTEM AND METHOD

CROSS-REFERENCE TO RELATED APPLICATION

This application is a continuation of U.S. Pat. No. 11,061,217, filed Jul. 29, 2018, which is hereby incorporated by reference herein.

GOVERNMENT LICENSE RIGHTS

This invention was made with government support under FA9451-16-D-0001 awarded by the Department of Defense. The government has certain rights in this invention.

TECHNICAL FIELD

Embodiments of the present disclosure relate to a support system for an optical element, and more particularly to a support system for a mirror used within a telescope.

BACKGROUND

In a typical Newtonian telescope, a telescope tube is used that includes a curved silvered mirror at the end of the telescope tube, in which the mirror is usually made out of glass. The mirror is supported at different points at the end of the telescope tube that allow adjustment of the mirror in one plane within the telescope tube. The edge of the mirror is also stabilized by an edge support, and safety clips retain the mirror in the end of the telescope tube, such as in the event that the telescope should point below the horizon to prevent the mirror from falling out of the telescope tube.

Such a support system for the Newtonian telescope is useful for smaller mirrors, such as up to about 8 inches (about 20.3 cm) in diameter. Further, smaller mirrors may be made relatively thin, such as to facilitate support of the mirrors within the telescope tube. However, larger mirrors, such as mirrors larger than about 8 inches diameter and including mirrors up to about 1.6 meters (about 5.25 feet) in diameter or more, often are thicker to reduce sagging or distortion of the mirror. Thus, for larger mirrors, different support systems may be used to spread the force applied by the mirror or to the mirror through gravity and the support system over a larger area. Consequently, support systems for larger mirrors are often more complicated.

The support system used for larger mirrors is responsible for spreading out any force applied to the mirror when supporting the mirror. If the force is not properly spread across the mirror from the support system, the mirror will deform or be damaged, thus affecting focus and adjustment of the telescope, and further impairing image quality and communications gain from the telescope.

Accordingly, what is needed is improved support systems for optical elements, in particular large mirrors used within telescopes, while limiting the adverse effect of the support system when in use.

SUMMARY

The systems, methods, apparatuses, and devices of the present disclosure each have several embodiments, no single one of which is solely responsible for its desirable attributes. Without limiting the scope of the present disclosure as expressed by the claims which follow, some features will now be discussed briefly. After considering this discussion, and particularly after reading the section entitled "Detailed Description" one will understand how the features of this disclosure provide advantages that include support for optical elements.

In one embodiment, an optical element support system is disclosed. The optical element support system includes an optical element with an optical axis, an arcuate front surface, and a back surface. The optical element support system further includes an axial support system to provide axial support to the optical element in a direction parallel to the optical axis of the optical element, and a lateral support system to provide lateral support to the optical element in one or more directions perpendicular to the optical axis of the optical element that is offset from a center-of-gravity of the optical element.

In another embodiment, an optical element support system for an optical element including an optical axis, an arcuate front surface, and a back surface is disclosed. The optical element support system includes a lateral support system to provide lateral support to the optical element in one or more directions perpendicular to the optical axis of the optical element that is offset from a center-of-gravity of the optical element.

In yet another embodiment, a method of providing support to an optical element including an optical axis, an arcuate front surface, and a back surface is disclosed. The method includes determining a center-of-gravity of the optical element, and providing support to the optical element. The providing the support to the optical element includes providing lateral support to the optical element in one or more directions perpendicular to the optical axis of the optical element, in which a summation of all, or substantially all, lateral support forces is offset from the center-of-gravity of the optical element along the optical axis, thereby applying a moment to the optical element, and providing axial support to the optical element in a direction parallel to the optical axis of the optical element, in which applying a counter-moment to the optical element.

Embodiments generally include methods, apparatus, and systems, as substantially described herein with reference to and as illustrated by the accompanying drawings. Numerous other aspects are provided.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF ILLUSTRATIONS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIG. 2 is a cross-sectional view of an optical element support system in accordance with one or more embodiments of the present disclosure.

FIG. 3 is a detailed view of the optical element support system shown in FIG. 2 in accordance with one or more embodiments of the present disclosure.

To facilitate understanding, identical reference numerals have been used, where possible, to designate identical elements that are common to the figures. It is contemplated that elements described in one aspect may be beneficially utilized on other aspects without specific recitation.

DETAILED DESCRIPTION

Figure 1:
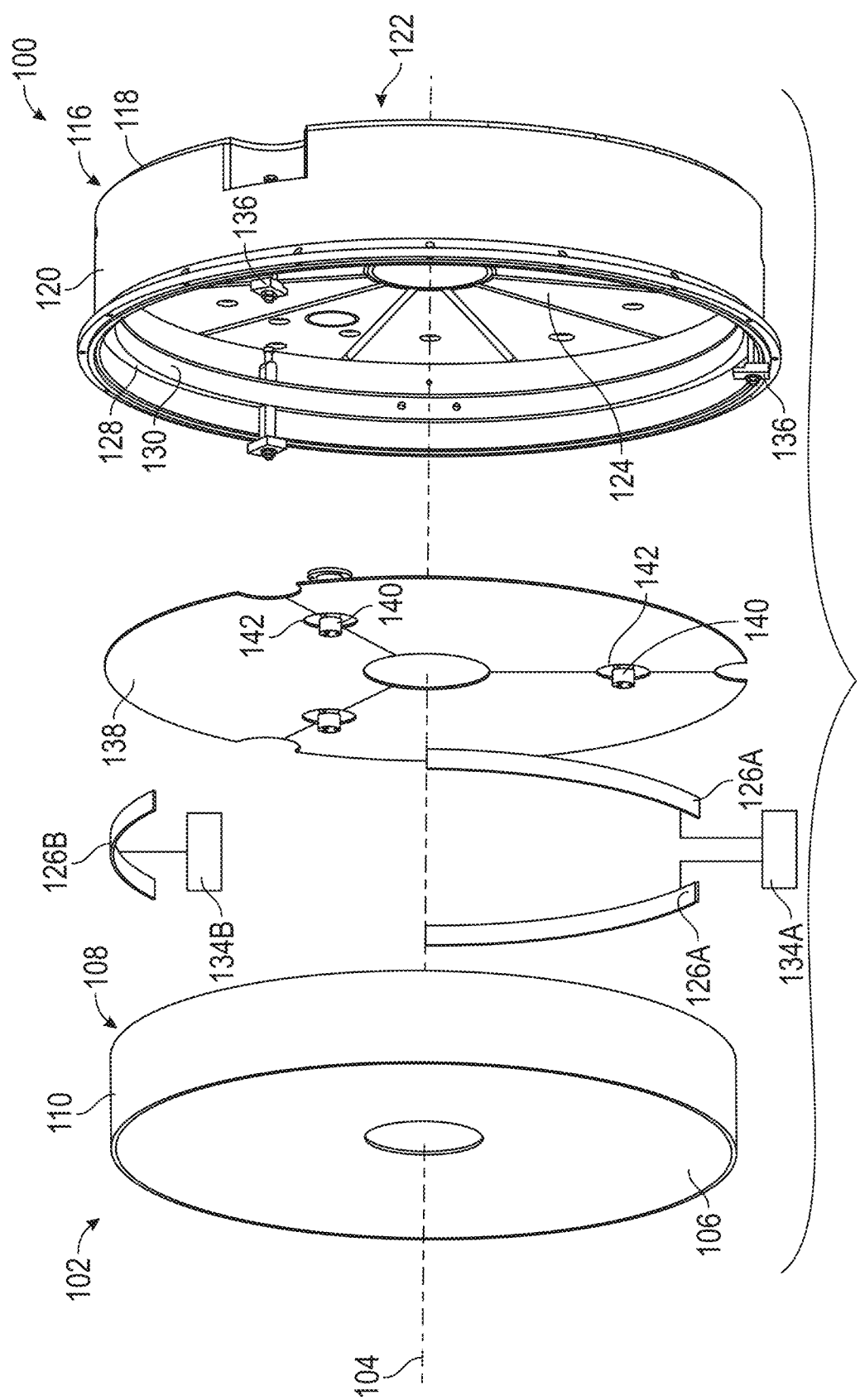
FIG. 1 is an exploded view of an optical element support system in accordance with one or more embodiments of the present disclosure.

In the following, reference is made to embodiments presented in the present disclosure. However, the scope of the present disclosure is not limited to specific described embodiments. Instead, any combination of the following features and elements, whether related to different aspects or not, is contemplated to implement and practice contemplated aspects. Furthermore, although embodiments disclosed herein may achieve advantages over other possible solutions or over the prior art, whether or not a particular advantage is achieved by a given aspect is not limiting of the scope of the present disclosure. Thus, the following embodiments, features, and advantages are merely illustrative and are not considered elements or limitations of the appended claims except where explicitly recited in a claim(s). Likewise, reference to "the invention" or "the disclosure" shall not be construed as a generalization of any inventive subject matter disclosed herein and shall not be considered to be an element or limitation of the appended claims except where explicitly recited in a claim(s).

As shown and described herein, various features of the disclosure will be presented. Various embodiments may have the same or similar features and thus the same or similar features may be labeled with the same reference numeral, but preceded by a different first number indicating the figure to which the feature is shown. Thus, for example, element "01" that is shown in Figure X may be labeled "X01" and a similar feature in Figure Z may be labeled "Z01." Although similar reference numbers may be used in a generic sense, various embodiments will be described and various features may include changes, alterations, modifications, etc. as will be appreciated by those of skill in the art, whether explicitly described or otherwise would be appreciated by those of skill in the art.

An optical element support system in accordance with one or more embodiments of the present disclosure may be used to support an optical element, such as a mirror or a lens, to reduce distortion for the optical element. The optical element includes an optical axis, an arcuate front surface, and a back surface. The optical axis of the optical element is defined through the optical element such that the optical axis extends through the arcuate front surface and the back surface of the optical element, and may further extend through the center-of-gravity of the optical element. Further, an edge, such as a circumferential edge, is formed or positioned about the optical axis of the optical element.

The optical element support system is used to support the optical element, such as within a telescope. As such, the telescope may include a telescope mount or a gimbal with the optical element support system movably coupled to the telescope mount or the gimbal. The optical element support system includes an axial support system and a lateral support system. The axial support system is used to provide axial support to the optical element in a direction parallel to the optical axis of the optical element. The lateral support system is used to provide lateral support to the optical element in one or more directions perpendicular to the optical axis of the optical element. Further, the lateral support provided by the lateral support system is offset from a center-of-gravity of the optical element in that the lateral support does not pass through the center-of-gravity of the optical element. More particularly, a summation of all, or substantially all, lateral support forces provided by the lateral support system is offset from the center-of-gravity of the optical element.

In one or more embodiments, the summation of substantially all of the lateral support forces is along the optical axis of the optical element, such as being positioned between the center-of-gravity and the arcuate front surface of the optical element, or being positioned between the center-of-gravity and the back surface of the optical element. For example, when the arcuate front surface includes a concave surface, the lateral support provided from the lateral support system is offset towards the back surface along the optical axis with respect to the center-of-gravity of the optical element. When the arcuate front surface includes a convex surface, the lateral support provided from the lateral support system is offset towards the arcuate front surface along the optical axis with respect to the center-of-gravity of the optical element. Further, the offset lateral support from the lateral support system may be used independently of the orientation of the optical element. For example, the optical element support system may be used with the optical axis of the optical element oriented perpendicular or non-perpendicular with respect to a direction of gravity acting on the center-of-gravity of the optical element.

The lateral support system is able to apply a moment (or torque) to the optical element by being offset from the center-of-gravity of the optical element. The axial support system then is able to apply a counter-moment (or counter-torque) to the optical element. The combination of the moment and counter-moment applied to the optical element through the optical element support system may be able to reduce the distortion or astigmatic shape of the optical element, particularly when in a horizontal orientation.

As discussed more below, components of the optical element support system may be used to provide axial support and/or lateral support to the optical element, and thus may be within or part of the axial support system and/or the lateral support system. For example, in one or more embodiments, components of the optical element support system may be used to only provide axial support or lateral support to the optical element, and thus such components may discretely or only be included within the axial support system or the lateral support system. However, components of the optical element support system may be used to provide axial support and lateral support to the optical element, and thus such components may be included within the axial support system and the lateral support system. Thus, components of the optical element support system may be identifiable as included within the axial support system, the lateral support system, or both.

Referring now to FIGS. 1-3, multiple views of an optical element support system 100 to provide support to an optical element 102 in accordance with one or more embodiments of the present disclosure are shown. In particular, FIG. 1 provides an exploded view of the optical element support system 100, FIG. 2 provides a cross-sectional view of the optical element support system 100, and FIG. 3 provides a detailed view of the optical element support system 100 shown in FIG. 2. The optical element support system 100 may be used to support the optical element 102, such as a mirror (as shown) or a lens, to reduce distortion for the optical element 102.

The optical element 102 includes an optical axis 104, an arcuate front surface 106, a back surface 108, and a circumferential edge 110. The optical element 102 is defined about the optical axis 104 such that the optical axis 104 extends through the arcuate front surface 106 and the back surface 108 of the optical element 102. The circumferential edge 110 is formed or positioned about the optical axis 104 of the optical element 102. Further, the optical element 102 has a center-of-gravity 112, identified specifically in FIG. 2, in which the optical axis 104 extends through the center-of-gravity 112. A lateral center-of-gravity line 114, also identified specifically in FIG. 2, is shown as extending laterally through the center-of-gravity 112 of the optical element 102.

The optical element support system 100 may include an optical element cell 116, in which the optical element 102 may be positioned or received within the optical element cell 116. The optical element cell 116 may be formed from or include metal, such as steel, and may include a cylindrical housing 118. The cylindrical housing 118 includes a cylindrical wall 120 and a back wall 122 or a back end. Further, one or more support walls 124 may be included within the cylindrical housing 118, such as extending across the cylindrical wall 120 and may be parallel with the back wall 122.

One or more pads 126A and 126B or bands may be included with the optical element support system 100, in which the pads 126A and 126B are positioned within the optical element cell 116. In particular, the pads 126A and 126B are positioned within the optical element cell 116 between the cylindrical wall 120 and the circumferential edge 110 of the optical element 102, in which the pads 126A and 126B are used to engage and support the circumferential edge 110 of the optical element 102. One or more of the pads 126A and 126B may be formed from a material that has a compressive strength lower than that of glass, as glass may be used to form the optical element 102. As such, the pads 126A and 126B may be formed from or include metal, such as Invar, or may be formed from or include a relatively softer material, such as rubber, plastic, foam, wood, and/or cork. In an embodiment in which more than one pad is included within the optical element support system 100, the pads 126A and 126B may be distributed about the circumferential edge 110 of the optical element 102, and more particularly equally distributed with respect to each other about the optical axis 104 of the optical element 102.

A pad support ring 128 may be included within the optical element cell 116. The pad support ring 128 is coupled to an interior of the cylindrical wall 120 of the optical element cell 116 to be positioned between the cylindrical wall 120 and the pads 126A and 126B. Further, the pad support ring 128 includes a recess 130 formed therein, in which the pads 126A and 126B are receivable within the recess 130 of the pad support ring 128. Further, the pad support ring 128 is shown as circular and may enclose the optical element 102, but the present disclosure is not so limited, as the pad support ring 128 may be separated into individual pad supports, such as a pad support corresponding to each pad 126A and 126B.

In one or more embodiments, one or more of the pads 126A and 126B may have a cavity formed therein, such as to contain a fluid within the cavity of the pads 126A and 126B. For example, FIG. 3 shows a cavity 132 formed within the upper pad 126B. Fluid may be included within cavities of the pads 126A and 126B to facilitate even engagement with and support to the optical element 102. The fluid may be, for example, a liquid or a gas, and more particularly may include water, oil, propylene glycol, mercury, a combination thereof, and/or any other known fluid.

Further, in one or more embodiments, the pads 126A and 126B, and more particularly fluid included within the cavities of the pads 126A and 126B, may be volume controlled and/or pressure controlled. The pads 126A and 126B include lower pads 126A, in which the lower pads 126A may be positioned to engage the circumferential edge 110 on a bottom half of the optical element 102. In such an embodiment, the lower pads 126A may be equally spaced from a lowermost point of the optical element 102 when the optical axis 104 is oriented perpendicular to a direction of gravity. In one embodiment, the cavities of the lower pads 126A may be volume controlled to maintain a constant or desired volume of the fluid within the cavities of the lower pads 126A, such as to compensate for variances in temperature. In particular, as the optical element 102 and the optical element cell 116 thermally expand with increased temperature, the volume of the fluid in the cavities of the lower pads 126A may be volume controlled to maintain the optical element 102 within a center of the optical element cell 116.

For example, a volume controller 134A may be in fluid communication with one or both of the cavities of the lower pads 126A to maintain a constant or desired volume of the fluid within the cavities. The volume controller 134A may be used to increase or decrease the amount (e.g., volume or weight) of the fluid within the cavities of the lower pads 126A to control volume. In one embodiment, the volume controller 134A may include a fluid reservoir (e.g., a bottle or a tank) that is in fluid communication with the cavities of the lower pads 126A to maintain the volume of the fluid within the cavities of the lower pads 126A. In another embodiment, the volume controller 134A may include hydraulic cylinder (e.g., a rolling diaphragm cylinder) in fluid communication with the cavities that is driven by an actuator (e.g., a lead screw actuator) and a motor. A temperature sensor may be used to control the volume controller in such an embodiment, and/or one or more position sensors (e.g., linear variable differential transformers) may be used to control the volume controller 134A. Further, the volume controller 134A, or one or more components thereof, may be positioned within or external to the optical element cell 116 when the optical element support system 100 is assembled.

The pads 126A and 126B may further include an upper pad 126B, in which the upper pad 126B may be positioned to engage the circumferential edge 110 on an upper half of the optical element 102. In such an embodiment, the upper pad 126B may be positioned at an uppermost point of the optical element 102 when the optical axis 104 is oriented perpendicular to a direction of gravity. In one embodiment, the cavity 132 of the upper pad 126B may be pressure controlled to maintain a constant or desired pressure of the fluid within the cavity 132 of the upper pads 126B, such as to compensate for variances in temperature, orientation of the optical element 102, and/or weight of the optical element 102 distributed within the optical element cell 116. In particular, as the pressure of the fluid within the cavity 132 will vary and increase with temperature and/or vary based upon the orientation of the optical element 102 and the optical element cell 116, the pressure of the fluid in the cavity 132 of the upper pad 126B may be pressure controlled to maintain the optical element 102 within a center of the optical element cell 116.

For example, a pressure controller 134B may be in fluid communication with the cavity 132 of the upper pad 126B to maintain a constant or desired pressure of the fluid within the cavity 132. The pressure controller 134B may also be used to increase or decrease the amount (e.g., volume or weight) of the fluid within the cavity 132 of the upper pad 126B to control pressure. In one embodiment, the pressure controller 134B may include hydraulic cylinder (e.g., a rolling diaphragm cylinder) that is in fluid communication with the cavity 132 with the hydraulic cylinder loaded or pressurized by a weight through a piston rod. A lever mechanism may be used to couple the weight to the piston rod, and/or a spring may be used, such as within the hydraulic cylinder, to apply a constant force and/or pressure to the fluid within the cavity 132. As with the volume controller 134A, the pressure controller 134B, or one or more components thereof, may be positioned within or external to the optical element cell 116 when the optical element support system 100 is assembled.

Referring still to FIGS. 1-3, the optical element support system 100 may further include a bladder 138 and one or more axial positioning pads 140. The bladder 138 is positioned within the optical element cell 116, such as between the back surface 108 of the optical element 102 and the back wall 122 (and more particularly the support wall 124 if included) of the optical element cell 116. The bladder 138 is used to engage the back surface 108 of the optical element 102, such as by being able to apply a compressive force to the back surface 108 of the optical element 102. The bladder 138 may include one or more cavities formed therein to contain fluid, such as liquid or gas (e.g., air), which may facilitate controlling the compressive force applied to the back surface 108 of the optical element 102 by the bladder 138.

The optical element support system 100, as shown, includes one or more safety edge clips 136. The safety edge clips 136 are coupled to the optical element cell 116, such as coupled to the cylindrical wall 120 and/or the support wall 124, and are used to selectively engage the optical element 102 to prevent excessive movement of the optical element 102 within the optical element cell 116. In particular, the safety edge clips 136, which are shown as distributed about the optical axis 104, are used to selectively engage the arcuate front surface 106 of the optical element 102. The safety edge clips may be used to retain the optical element 102 within the optical element cell 116 and prevent the optical element 102 from falling out of the optical element cell 116, such as in the event of the optical axis 104 of the optical element 102 being oriented below the horizon or a force (e.g., earthquake or an exterior force) disturbing the optical element 102 within the optical element cell 116.

Further, the axial positioning pads 140 are coupled to the optical element cell 116, such as by being coupled to the back wall 122 of the optical element cell 116. The axial positioning pads 140 are used to engage and/or couple to the back surface 108 of the optical element 102, such as for applying a compressive or tensile force to the back surface 108 of the optical element 102. The axial positioning pads 140 may be adjustable with respect to the optical element cell 116 (e.g., such as in height or in the direction of the optical axis 104) to adjust engagement with the optical element 102. Further, one or more holes 142 may be formed within the bladder 138 with the axial positioning pads 140 positioned through the holes 142 to facilitate engagement between the bladder 138 and the axial positioning pads 140 with the optical element 102.

As discussed above, the optical element support system 100 includes an axial support system and a lateral support system to support the optical element 102, such as to axially support and laterally support the optical element 102. Generally, the axial support system is used to provide axial support to the optical element 102 in a direction parallel to the optical axis 104 of the optical element 102. Further, the lateral support system is used to provide lateral support to the optical element 102 in one or more directions perpendicular to the optical axis 104 of the optical element 102.

One or more components of the optical element support system 100 described above and discussed more below may be included within the axial support system and/or the lateral support system. For example, in the optical element support system 100 shown in FIGS. 1-3, the safety edge clips 136, the bladder 138, and/or the axial positioning pads 140 may be included within the axial support system, as these components may be used to apply force and provide support to the optical element 102 in the direction parallel to the optical axis 104 of the optical element 102. Further, the pads 126A and 126B may be included within the lateral support system, as these components may be used to apply force and provide support to the optical element 102 in one or more directions perpendicular to the optical axis 104 of the optical element 102, such as in a direction perpendicular and vertical to the optical axis 104 of the optical element 102 and/or a direction perpendicular and lateral to the optical axis 104 of the optical element 102.

As such, the lateral support provided by the lateral support system is offset from a center-of-gravity 112 of the optical element 102, in that the lateral support does not pass through the center-of-gravity 112 of the optical element 102. More particularly, a summation of all, or substantially all, lateral support forces provided by the lateral support system, such as the lateral support forces provided by the pads 126A and 126B in the optical element support system 100, is offset from the center-of-gravity 112 of the optical element 102.

FIG. 3 provides a detailed view of the engagement between the pads 126A and 126B with the circumferential edge 110 the optical element 102. The lateral center-of-gravity line 114 extends through the center-of-gravity 112 of the optical element 102 and is perpendicular to the optical axis 104 of the optical element 102. A center-of-support line 144 from the pads 126A and 126B is shown in FIG. 3 to identify the plane through which the pads 126A and 126B provide lateral support to the optical element 102. The center-of-support line 144 is shown as offset by a distance O from the lateral center-of-gravity line 114. As the pads 126A and 126B are included within and may make up the entirety of the lateral support system used within the optical element support system 100, the center-of-support line 144 may be used to identify the summation of substantially all lateral support forces provided by the lateral support system to the optical element 102. Thus, the lateral support provided by the lateral support system is offset by the distance O from a center-of-gravity 112 (e.g., the lateral center-of-gravity line 114) of the optical element 102, in that the lateral support does not pass through the center-of-gravity 112 of the optical element 102. For example, in one embodiment, the optical element 102 may have a diameter of about 1.6 meters (about 5.25 feet), a thickness of about 25.4 cm (about 10 inches), and a vertex radius of about 880 cm (about 346 inches). In such an embodiment, the lateral support provided by the lateral support system may be offset by about 0.457 cm (about 0.18 inches) from the center-of-gravity 112 of the optical element 102 along the optical axis 104.

As the lateral support from the lateral support system is offset from the center-of-gravity 112 of the optical element 102, the lateral support system is able to apply a moment (or torque) to the optical element 102. The moment applied to the optical element 102 through the lateral support system may induce distortion or an astigmatic shape to the optical element 102. Further, the axial support system may then be used to apply a counter-moment (or counter-torque) to the optical element 102, such as to balance the sum of the moments applied to the optical element 102 through the lateral support system and the axial support system. The counter-moment applied to the optical element 102 through the axial support system may also induce distortion or an astigmatic shape to the optical element 102. However, when used in combination, the moment and counter-moment applied through the lateral support system and the axial support system may be able to overall reduce the distortion or astigmatic shape of the optical element, particularly when in a horizontal orientation.

Figure 4:
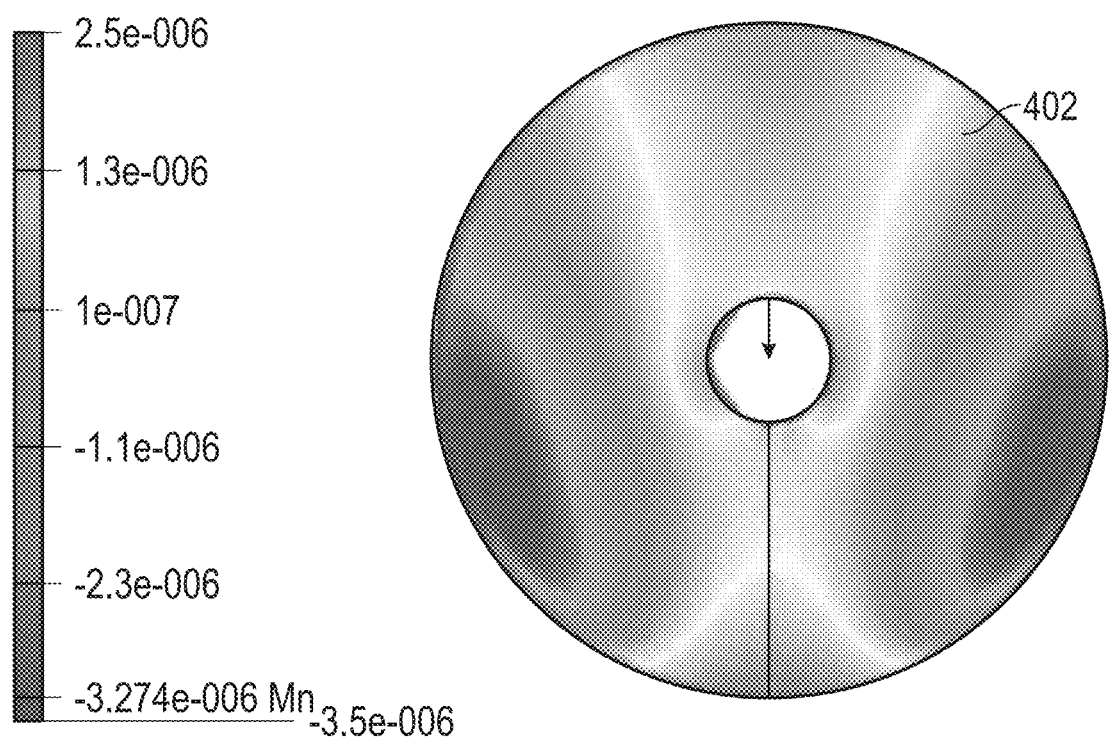
FIG. 4 is a front analytical view of distortion induced by an optical element supported by an optical support system in which the lateral support is not offset from a center-of-gravity of the optical element.
Figure 5:
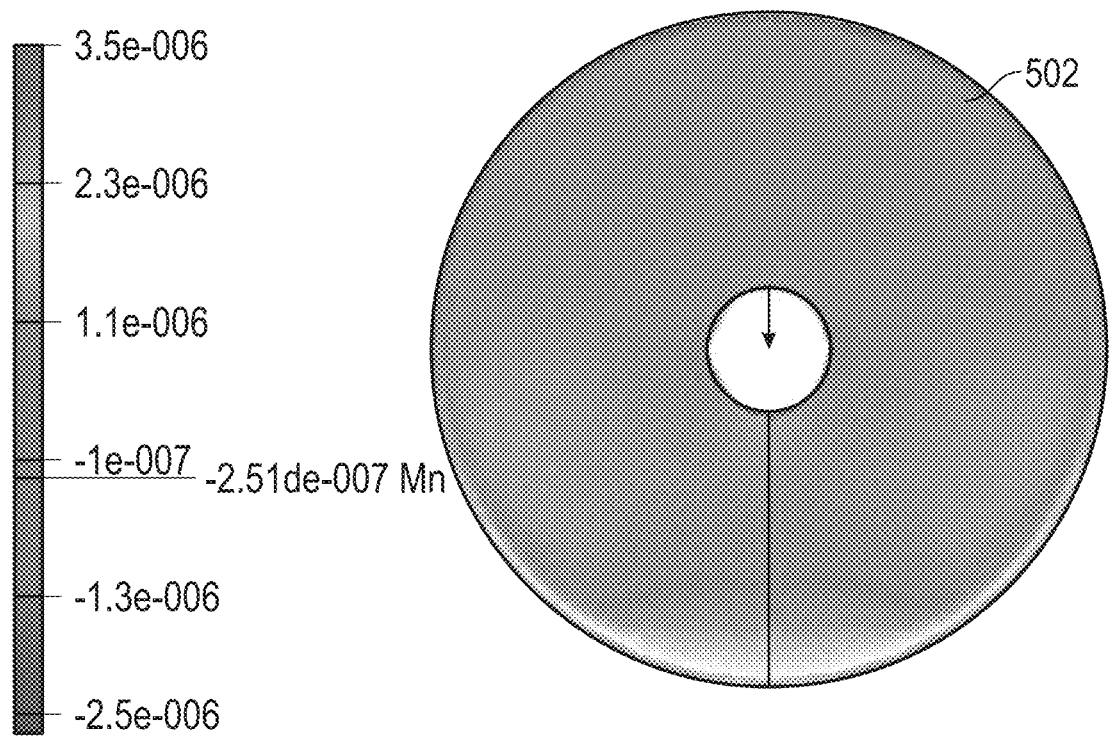
FIG. 5 is a front analytical view of distortion induced by an optical element supported by an optical support system in which the lateral support is offset from a center-of-gravity of the optical element in accordance with one or more embodiments of the present disclosure.

For example, FIGS. 4 and 5 show front analytical views of distortion induced by optical elements 402 and 502, respectively, when supported by different optical support systems. The optical element 402 of FIG. 4 is supported by an optical support system in which the lateral support provided by the lateral support system to the optical element 402 is not offset from the center-of-gravity of the optical element 402. Thus, the lateral support from the lateral support system extends through the center-of-gravity of the optical element 402. The optical element 502 of FIG. 5, on the other hand, is supported by an optical support system in which the lateral support provided by the lateral support system to the optical element 502 is offset from the center-of-gravity of the optical element 502. As shown in a comparison between FIGS. 4 and 5, distortion induced by the optical element 502 is reduced or minimized compared to the distortion induced by the optical element 402, particularly when closer to the optical axis for the optical elements 402 and 502.

The lateral support from the lateral support system may be offset behind or in front of the center-of-gravity of the optical element. For example, with reference to FIGS. 1-3, the optical element 102 includes the arcuate front surface 106, in which the arcuate front surface 106 includes a concave surface. In such an embodiment, the lateral support provided from the lateral support system is offset towards the back surface 108 with respect to the center-of-gravity 112 of the optical element 102. However, in another embodiment in which the arcuate front surface of the optical element includes a convex surface, the lateral support provided from the lateral support system may be offset towards the arcuate front surface with respect to the center-of-gravity of the optical element.

In one or more embodiments, components of an optical element support system may be used to provide axial support and/or lateral support to the optical element, and thus may be within or part of the axial support system and/or the lateral support system. For example, in the embodiment shown in FIGS. 1-3, components of the optical element support system 100 may be used to only provide axial support or lateral support to the optical element 102, and thus such components may discretely or only be included within the axial support system or the lateral support system. More particularly, the safety edge clips 136, the bladder 138, and/or the axial positioning pads 140 may only be included within the axial support system, as these components may only provide axial support (e.g., support in the direction parallel to the optical axis 104) to the optical element 102, and the pads 126A and 126B may only be included within the lateral support system, as these components may only provide lateral support (e.g., support in directions perpendicular to the optical axis 104) to the optical element 102. However, the present disclosure is not so limited, as components of an optical element support system may be used to provide axial support and lateral support to the optical element. Thus, such components may be included within the axial support system and the lateral support system. Accordingly, components of an optical element support system may be identifiable as included within the axial support system, the lateral support system, or both.

Figure 6:
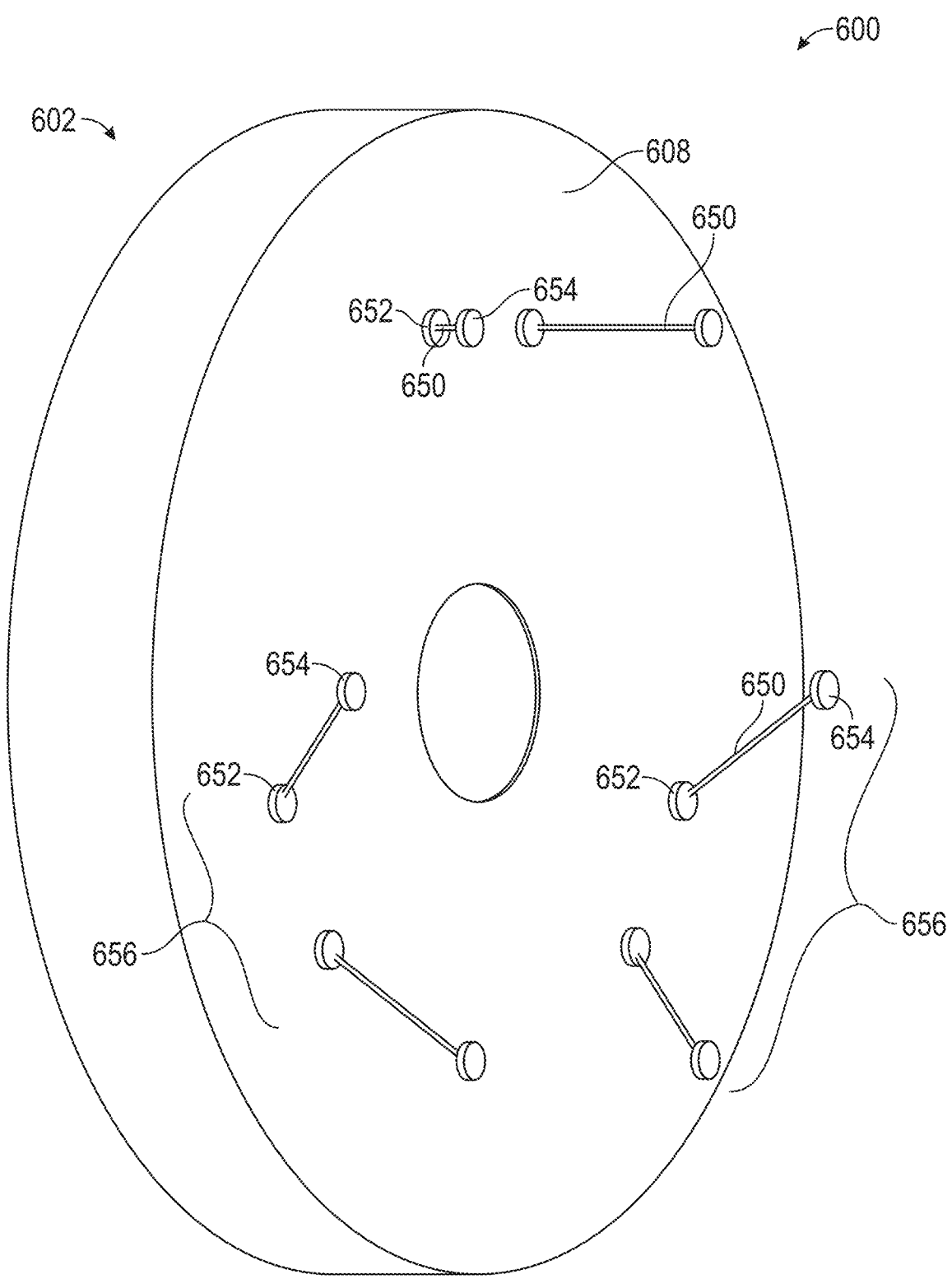
FIG. 6 is a back perspective view an optical element support system to provide support to an optical element in accordance with one or more embodiments of the present disclosure.

Referring now to FIG. 6, a back perspective view an optical element support system 600 to provide support to an optical element 602 in accordance with one or more embodiments of the present disclosure is shown. In this embodiment, the optical element support system 600 includes one or more support legs 650, in which the support legs 650 may be used to provide axial support and lateral support to the optical element 602. Thus, the support legs 650 may be included within the axial support system and the lateral support system of the optical element support system 600.

The optical element support system 600 may include or be used with an optical element cell, such as the optical element cell 116 shown in FIGS. 1-3. Accordingly, the support legs 650 may be positioned within the optical element cell when in use with the optical element 602. The support legs 650 are coupled between a back surface 608 of the optical element 602 and the optical element cell, such as the back wall or a support wall of the optical element cell. As such, optical element attachment pads 652 may be used to couple one end of each support leg 650 to the back surface 608 of the optical element 602. Further, cell attachment pads 654 may be used to couple the other end of each support leg 650 to the back wall or the support wall of the optical element cell.

The support legs 650 are used to support the optical element 602 in tension and/or compression. For example, the support legs 650 may be flexible and include a wire, or may be rigid and include a rod. Further, the support legs 650 may be used in pairs 656 to support the optical element 602. In such an embodiment, the pairs 656 of the support legs 650 may be equally distributed with respect to each other about the optical axis of the optical element 602, as shown in FIG. 6. Furthermore, an axis of each support leg 650 of the pairs 656 may intersect at a point, thereby defining three different intersection points for each pair 656 of the support legs 650.

These three intersection points may define a plane for a lateral support system of the optical element support system 600, in which the plane of the lateral support system is offset from a center-of-gravity of the optical element 602.

Figure 7:
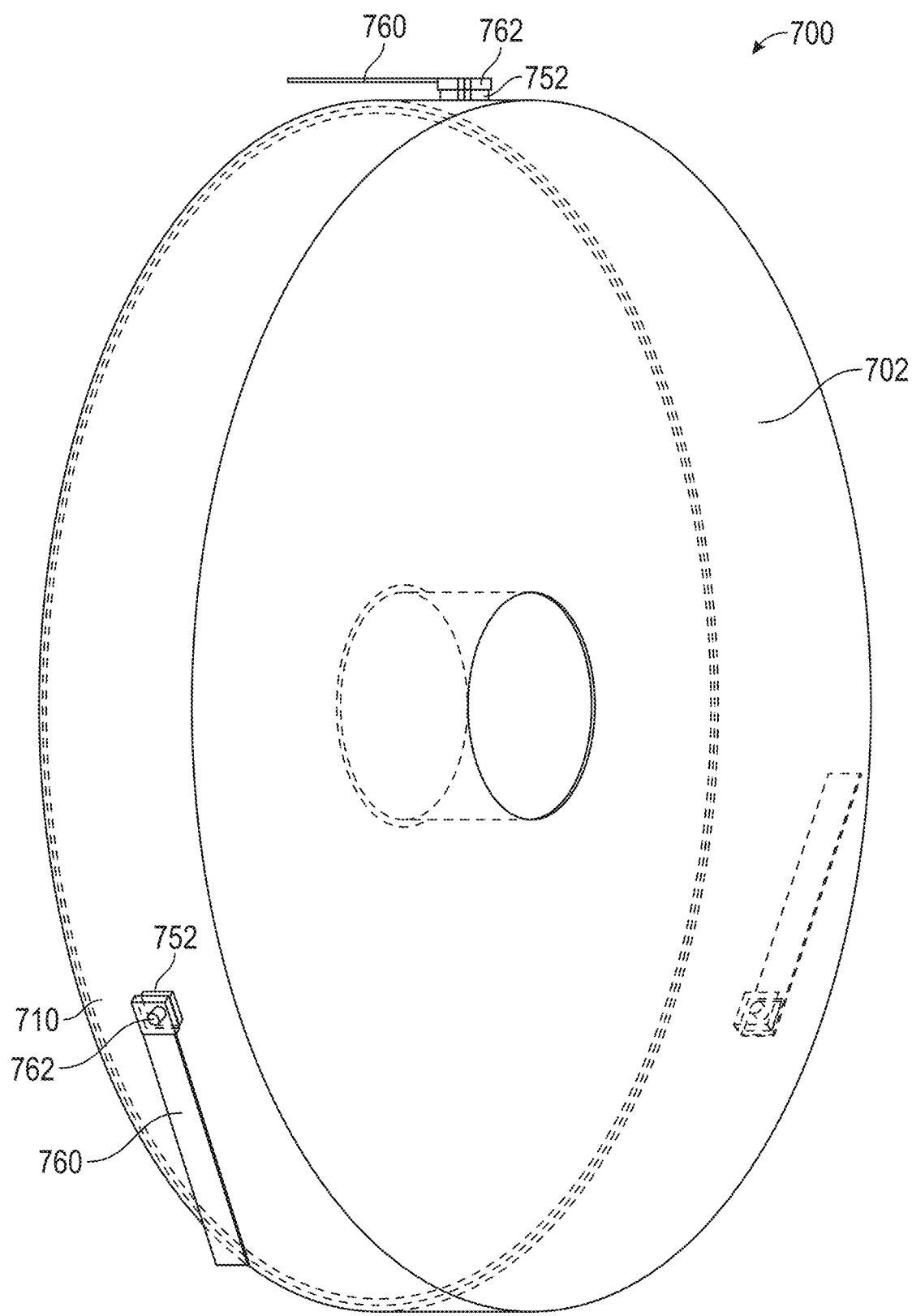
FIG. 7 is a back perspective and ghosted view an optical element support system to provide support to an optical element in accordance with one or more embodiments of the present disclosure.

Referring now to FIG. 7, a back perspective and ghosted view an optical element support system 700 to provide support to an optical element 702 in accordance with one or more embodiments of the present disclosure is shown. In this embodiment, the optical element support system 700 includes one or more tangent arms 760, in which the tangent arms 760 may be used to provide axial support and lateral support to the optical element 702. Thus, as with the embodiment shown in FIG. 6, the tangent arms 760 may be included within the axial support system and the lateral support system of the optical element support system 700.

The optical element support system 700 may include or be used with an optical element cell. Accordingly, the tangent arms 760 may be positioned within the optical element cell when in use with the optical element 702. The tangent arms 760 are coupled between a circumferential edge 710 of the optical element 702 and the optical element cell, such as the cylindrical wall of the optical element cell. Further, the tangent arms 760 may be pivotably coupled between the optical element 702 and the optical element cell. For example, each tangent arm 760 may be coupled to the circumferential edge 710 of the optical element 702 through a pivot 762 (e.g., a single axis pivot), such as a flexure or pin joint. As shown, an optical element attachment pad 752 is coupled to the circumferential edge 710 of the optical element 702 with the pivot 762 coupled between the optical element attachment pad 752 and the tangent arm 760.

The tangent arms 760 are used to support the optical element 702 in tension, compression, and/or deflection. For example, the tangent arms 760 may be formed from metal, such as sheet metal. Further, the tangent arms 760 may be equally distributed with respect to each other about the optical axis of the optical element 702. When the pivots 762 are co-planar, in that an axis of the pivots 762 intersect with each other, the pivots 762 may be used to define a plane for a lateral support system of the optical element support system 700, in which the plane of the lateral support system is offset from a center-of-gravity of the optical element 702.

Figure 8:
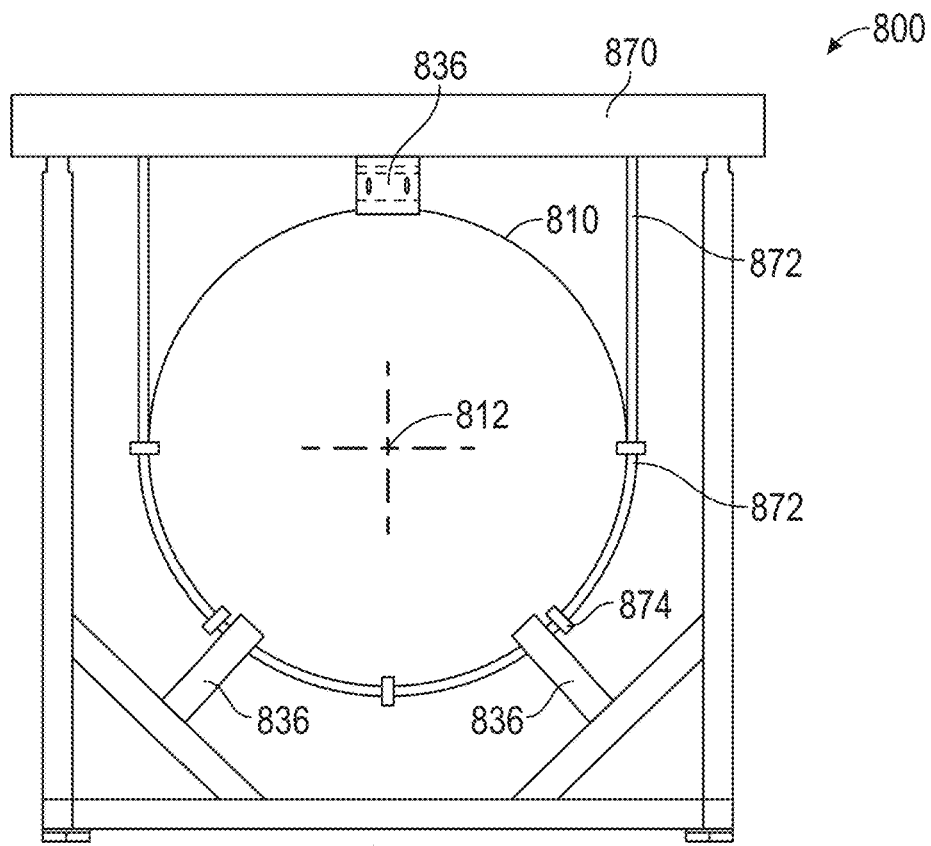
FIG. 8 is a front view of an optical element support system to provide support to an optical element in accordance with one or more embodiments of the present disclosure.
Figure 9:
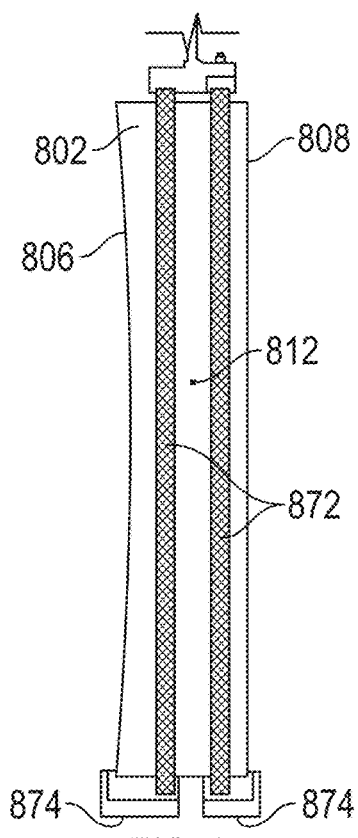
FIG. 9 is a side view of an optical element support system to provide support to an optical element in accordance with one or more embodiments of the present disclosure.

Referring now to FIGS. 8 and 9, multiple views of an optical element support system 800 to provide support to an optical element 802 in accordance with one or more embodiments of the present disclosure are shown. In particular, FIG. 8 provides a front view of the optical element support system 800 supporting the optical element 802, and FIG. 9 provides a side view of the optical element support system 800 supporting the optical element 802.

The optical element support system 800 includes a frame 870 and one or more flexible supports 872. For example, one of the flexible supports 872 is positioned closer to an arcuate front surface 806 of the optical element 802, and another one of the flexible supports 872 is positioned closer to a back surface 808 of the optical element 802. The flexible supports 872 may include a wire, rope, tether, chain, and/or other type of flexible support, in which the flexible supports 872 may be coupled at each end to the frame 870. The flexible supports 872 are used to engage a circumferential edge 810 of the optical element 802 for support. In this embodiment, the flexible supports 872 each coupled to a top of the frame 870 and are used to engage substantially a bottom half of the optical element 802 at the circumferential edge 810 (e.g., about a lower 180 degrees of the circumferential edge 810 of the optical element 802).

The flexible supports 872 may make up the lateral support system of the optical element support system 800, and thus the lateral support provided from the flexible supports 872 may be offset from a center-of-gravity 812 from the optical element 802. One or more flexible support retainers 874 are also included within the optical element support system 800 to retain the position of the flexible supports 872. For example, the flexible support retainers 874 may be used to retain the position of the flexible supports 872 about the circumferential edge 810 of the optical element 802 by being positioned over the flexible supports 872 at the circumferential edge 810 of the optical element 802. Furthermore, one or more safety edge clips 836 may be included within the optical element support system 800. The safety edge clips 836 may be used to selectively engage the arcuate front surface 806 and/or the back surface 808 of the optical element 802, such as to prevent excessive movement of the optical element 802 within the optical element support system 800 and/or to apply a moment or counter-moment to the optical element 802.

Figure 10:
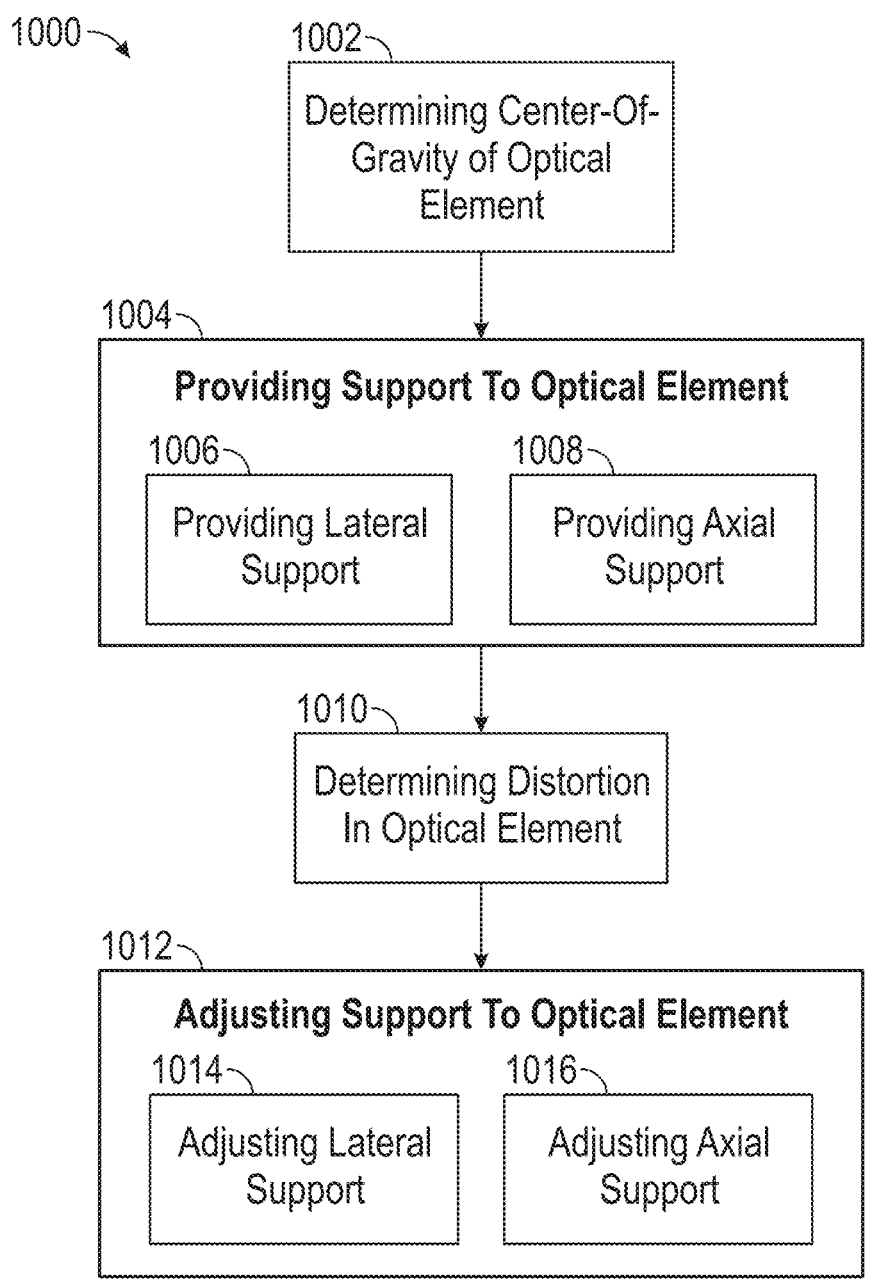
FIG. 10 is a flowchart of a method of providing support to an optical element in accordance with one or more embodiments of the present disclosure.

Referring now to FIG. 10, a flowchart of a method 1000 of providing support to an optical element in accordance with one or more embodiments of the present disclosure is shown. The method 1000 includes determining a center-of-gravity of the optical element in an operation 1002, in which the optical element includes an optical axis, an arcuate front surface, a back surface, and a circumferential edge. The method 1000 further includes providing support to the optical element in an operation 1004, such as based upon the center-of-gravity determined for the optical element in operation 1002. For example, the operation 1004 includes providing lateral support to the optical element in one or more directions perpendicular to the optical axis of the optical element in operation 1006, in which a summation of substantially all lateral support forces is offset from the center-of-gravity of the optical element along the optical axis. The operation 1006 may result in applying a moment to the optical element as well. Further, the operation 1004 includes providing axial support to the optical element in a direction parallel to the optical axis of the optical element in operation 1008, which may result in applying a counter-moment to the optical element. Operations 1006 and 1008 may be done concurrently or separately, such as depending on the optical support system used to support the optical element.

The method 1000 further includes determining distortion in the optical element in operation 1010, such as to determine the distortion that results from the lateral support and the axial support provided to the optical element in operations 1006 and 1008. If the distortion for the optical element is acceptable or below a predetermined level, the method 1000 may stop. However, if the distortion is not acceptable and is above a predetermined level (e.g., amount, location, and/or proportion of distortion is above a predetermined level), the method 1000 may continue with adjusting the support to the optical element in operation 1012, such as based upon the determined distortion in the optical element in operation 1010. In such an embodiment, operation 1010 may include adjusting the lateral support to the optical element in operation 1012, in which the summation of the lateral support forces continues to be offset from the center-of-gravity of the optical element along the optical axis. The operation 1012 may result in adjusting the moment applied to the optical element as well. Further, the operation 1010 includes adjusting the axial support to the optical element in operation 1016, which may result in adjusting the counter-moment applied to the optical element. Operations 1014 and 1016 may be done concurrently or separately, such as depending on the optical support system used to support the optical element.

The method 1000 may be an iterative process, in that operations 1010-1016 may be repeated until a desired amount of distortion for the optical element is achieved. Further, computer modeling may facilitate the use of method 1000, such as through finite element analysis. In such an embodiment, a model for the optical element may be created, and finite element analysis may be performed with the model of the optical element to create an optical element support system in accordance with the present disclosure.

An optical element support system in accordance with the present disclosure may provide one or more advantages or benefits. In one embodiment, the optical element support system may be used to reduce distortion in an optical element, such as for a large diameter mirror (e.g., about 1.2 meters in diameter or more) used within a telescope. The optical element may become distorted when in a vertical orientation (e.g., the optical axis of the optical element is parallel to the horizon or perpendicular to the direction of gravity) as the optical element includes an arcuate front surface with gravity acting on the arcuate front surface. An optical element support system in accordance with the present disclosure may be able to impart and balance moments across the optical element to minimize the distortion of the optical element.

Further, one having the benefit of the present disclosure may be able to modify existing optical element support systems to reduce distortion to the optical elements. For example, an existing optical element support system may be modified such that the lateral support provided to the optical element is offset, such as described above in accordance with one or more embodiments of the present disclosure. In one or more embodiments, an optical element support system may be used within a Newtonian telescope, and/or may be used within other systems containing one or more optical elements, such as a Cassegrain type reflector, a Schmidt-Cassegrain telescope, a Ritchey-Chretien telescope, a Gregorian telescope, and/or a Maksutov telescope. Accordingly, the present disclosure may be used within new optical element support systems, and/or may be used to modify existing optical element support systems.

Furthermore, one or more of the optical elements shown above have an arcuate front surface, a flat back surface, is round or cylindrical shaped with a circumferential edge, and has a rotational symmetry. However, an optical element in accordance with the present disclosure is not so limited. For example, an optical element may have a curved or arcuate back surface, in which the radius for the arcuate back surface is different than the radius for the arcuate front surface (e.g., not a bi-convex or bi-concave with the same radius for the front surface and the back surface). The optical element may have other cross-sectional shapes, such as by having a hexagonal or rectangular shape, as opposed to the circular shapes shown above such that the outer edge of the optical has other shapes than a circumferential shape. The optical element may have an outer edge that is not circumferential, but instead is tapered or varies, and the thickness of the optical element may also vary. Further, the optical element may also not have rotational symmetry. Accordingly, an optical element support system in accordance with the present disclosure may be used with optical elements that are not limited to the embodiments shown above.

While the present disclosure has been described in detail in connection with only a limited number of embodiments, it should be readily understood that the present disclosure is not limited to such described embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments.

The term "about" and "substantially" is intended to include the degree of error or uncertainty associated with measurement of the particular quantity based upon the equipment available at the time of filing the application. For example, "about" and "substantially" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof.

Therefore, it is intended that the present disclosure not be limited to the particular embodiment described as the best mode contemplated for carrying out this present disclosure, but that the present disclosure will include all embodiments falling within the scope of the claims.

What is claimed is:

1. An optical element support system, comprising:
   an optical element comprising an optical axis, an arcuate front surface, and a back surface;
   an axial support system configured to provide axial support to the optical element in a direction parallel to the optical axis of the optical element; and
   a lateral support system comprising a pad positioned about a circumferential edge of the optical element, the lateral support system configured to provide lateral support to the optical element in one or more directions perpendicular to the optical axis of the optical element that is offset from a center-of-gravity of the optical element to apply a moment to the optical element, wherein the axial support system is configured to apply a counter-moment to the optical element.

2. The optical element support system of claim 1, wherein a summation of substantially all lateral support forces provided by the lateral support system is offset from the center-of-gravity of the optical element along the optical axis.

3. The optical element support system of claim 1, wherein the optical element comprises a mirror or a lens.

4. The optical element support system of claim 1, wherein the arcuate front surface comprises a concave surface with the lateral support provided from the lateral support system offset towards the back surface along the optical axis with respect to the center-of-gravity of the optical element.

5. The optical element support system of claim 1, wherein the arcuate front surface comprises a convex surface with the lateral support provided from the lateral support system offset towards the back surface along the optical axis with respect to the center-of-gravity of the optical element.

6. The optical element support system of claim 1, wherein:
the optical element is received in an optical element housing.

7. The optical element support system of claim 6, wherein:
the pad is positioned between a cylindrical wall of the optical element housing and the circumferential edge of the optical element with the pad configured to engage the circumferential edge of the optical element.

8. The optical element support system of claim 7, wherein:
the pad comprises a cavity configured to contain fluid within the cavity.

9. The optical element support system of claim 6, wherein:
the pad comprises a plurality of pads distributed about the circumferential edge of the optical element.

10. The optical element support system of claim 9, wherein:
the plurality of pads comprise a first lower pad and a second lower pad with cavities of the first lower pad and the second lower pad configured to contain a fluid and be volume controlled to maintain a constant volume of the fluid within the cavities of the first lower pad and the second lower pad.

11. The optical element support system of claim 10, wherein the plurality of pads further comprise a third upper pad having a cavity, the cavity of the third upper pad configured to be pressure controlled to maintain a constant pressure within the cavity of the third upper pad.

12. The optical element support system of claim 6, wherein:
the axial support system further comprises a bladder positioned within the optical element housing between a back wall of the optical element housing and the back surface of the optical element;
the bladder configured to engage the back surface of the optical element; and
the bladder comprises a cavity configured to contain fluid within the cavity.

13. The optical element support system of claim 6, wherein the axial support system further comprises an axial positioning pad coupled to the optical element housing and configured to engage the back surface of the optical element.

14. The optical element support system of claim 1, wherein:
the lateral support system comprises a flexible support coupled at each end to an optical element housing with the flexible support configured to couple to the circumferential edge at a bottom half of the optical element.

15. An optical element support system, comprising:
an optical element housing;
an optical element positioned in the optical element housing, the optical element comprising an optical axis, an arcuate front surface, and a back surface; and
a support system comprising a plurality of support leg pairs coupled between the back surface of the optical element and a back wall of the optical element housing, wherein each of the plurality of support leg pairs intersect at a point of intersection defining a plane that is offset from a center-of-gravity of the optical element to apply a moment to the optical element, wherein the support system is configured to apply a counter-moment to the optical element.

16. The optical element support system of claim 15, wherein:
the plurality of support leg pairs are equally distributed with respect to each other about the optical axis of the optical element.

17. The optical element support system of claim 15, wherein each support leg comprises a wire or a rod.

18. The optical element support system of claim 15, wherein:
the arcuate front surface comprises a concave surface with the plane being offset towards the back surface along the optical axis with respect to the center-of-gravity of the optical element.

19. The optical element support system of claim 15, wherein:
the arcuate front surface comprises a convex surface with the plane being offset towards the back surface along the optical axis with respect to the center-of-gravity of the optical element.

20. An optical element support system, comprising:
an optical element housing;
an optical element positioned in the optical element housing, the optical element comprising an optical axis, an arcuate front surface, and a back surface;
an axial support system configured to provide axial support to the optical element in a direction parallel to the optical axis of the optical element; and
a lateral support system comprising a plurality of tangent arms coupled between the optical element housing and a circumferential edge of the optical element, wherein each of the tangent arms are in a plane offset from a center of gravity of the optical element, to apply a moment to the optical element, wherein the axial support system is configured to apply a counter-moment to the optical element.

21. The optical element support system of claim 20, wherein the axial support is provided by the plurality of tangent arms.

* * * * *